United States Patent [19]

Caruel et al.

[11] 4,085,581
[45] Apr. 25, 1978

[54] GAS-TURBINE COMBUSTOR HAVING AN AIR-COOLED SHIELD-PLATE PROTECTING ITS END CLOSURE DOME

[75] Inventors: Jacques Emile Jules Caruel, Dammarie-les-Lys; Guy Daniel Stora, Melun, both of France

[73] Assignee: Societe Nationale d'Etude et de Construction de Moteurs d'Aviation, Paris, France

[21] Appl. No.: 690,669

[22] Filed: May 27, 1976

[30] Foreign Application Priority Data

May 28, 1975 France .................................. 75 17087

[51] Int. Cl.² .............................................. F02C 7/22
[52] U.S. Cl. .................................. 60/39.66; 60/39.71; 60/39.74 R
[58] Field of Search ................. 60/39.65, 39.66, 39.71, 60/39.74 R

[56] References Cited

U.S. PATENT DOCUMENTS

| | | | |
|---|---|---|---|
| 3,430,443 | 3/1969 | Richardson et al. | 60/39.65 |
| 3,570,241 | 3/1971 | Alexander | 60/39.66 |
| 3,656,298 | 4/1972 | Wade | 60/39.65 |
| 3,777,484 | 12/1973 | Dibelius et al. | 60/39.66 |
| 3,899,876 | 8/1975 | Williamson | 60/39.65 |
| 3,916,619 | 11/1975 | Masai et al. | 60/39.65 |

FOREIGN PATENT DOCUMENTS

| | | | |
|---|---|---|---|
| 2,152,465 | 4/1973 | France. | |
| 200,964 | 12/1968 | U.S.S.R. | 60/39.66 |

*Primary Examiner*—Robert E. Garrett
*Attorney, Agent, or Firm*—Watson, Cole, Grindle & Watson

[57] ABSTRACT

A combustion chamber for, for example, an aircraft gas turbine engine, has an upstream end wall protected by a plate serving as a heat shield, the shield-plate being spaced from the dome and cooled by fluid flowing through orifices in the dome. The shield plate is itself formed with a plurality of small dimension orifices which create fluid jets of considerable velocity which serve to atomize any liquid fuel which may stream over the shield-plate and to increase turbulence.

4 Claims, 4 Drawing Figures

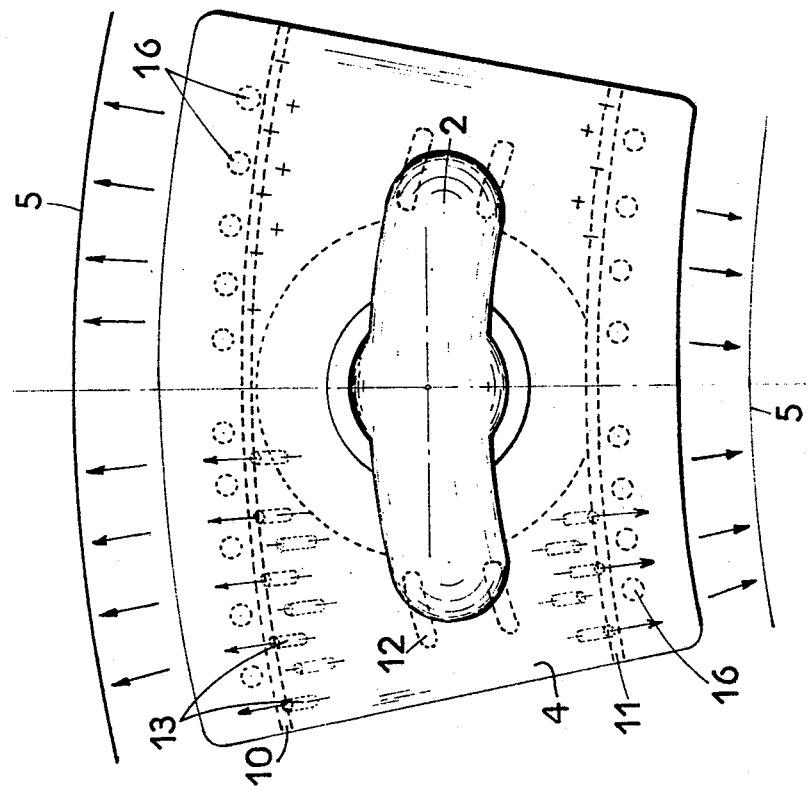
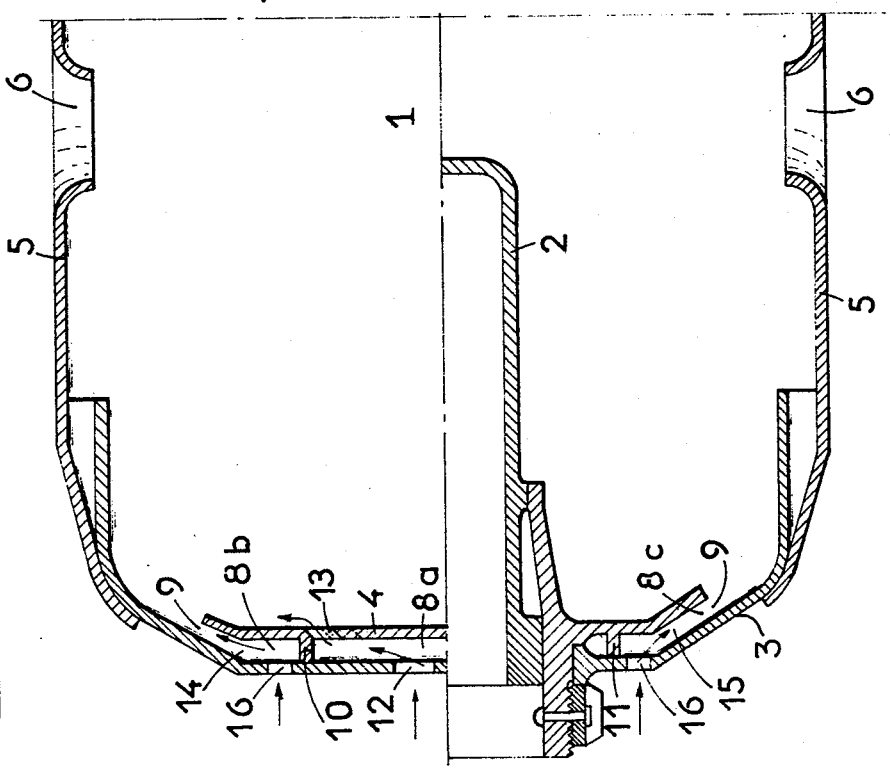

GAS-TURBINE COMBUSTOR HAVING AN AIR-COOLED SHIELD-PLATE PROTECTING ITS END CLOSURE DOME

BACKGROUND OF THE INVENTION

1. Field of the Invention

This invention relates to combustion chambers which are cooled by means of an air film, and is concerned with that type of combustion chamber comprising a dome-shaped front or end wall which is perforated in its median part to receive one or more burners, the combustion space being separated from the front wall by a shield-plate forming a heat screen to protect the end of the chamber.

2. Description of the Prior Art

In U.S. Pat. No. 3,735,589 and French Patent No. 71 33401 a combustion chamber of the type to which the present invention is directed is described which is intended especially for aircraft turbojets or other gas turbine engines where a fuel is burnt in a flow of high pressure air and where there is a serious problem of ensuring efficient cooling of the end wall in question.

A number of drawbacks have been encountered at low ratings, particularly when using prevaporization because of the low temperature of the air fed to the combustion chamber: part of the fuel streams over the end wall of the chamber or onto the shield-plate and does not take part in the combustion process. Further, at low ratings, whatever the method of injection, combustion is localized to the immediate vicinity of the cold walls at the end of the chamber and the gas reactions are rapidly frozen before complete combustion can be effected.

It is an object of the present invention to improve the combustion efficiency at reduced ratings (especially under idling conditions) by effecting atomization of any fuel which may stream over the end wall of the chamber and by locally increasing turbulence, thus promoting more efficient combustion. Any improvement of combustion efficiency under idling conditions is of significance since it affords a notable lowering of levels of pollution by carbon monoxide and unburnt hydrocarbons.

SUMMARY OF THE INVENTION

The improvement provided by the present invention consists in making numerous small dimension holes through the shield-plate so as to create high speed jets which, on the one hand, atomize the liquid fuel streaming over the shield plate and, on the other hand, allow more rapid combustion by increasing local turbulence.

According to a further feature of the invention, the shield-plate has two walls resting against the end wall of the chamber in such a way as to divide the space between the shield-plate and the chamber end wall into three zones: a central zone and lateral zones on either side of it. Furthermore, in the region of the central zone the shield-plate is perforated by small dimension holes inclined outwards, whilst the end wall of the chamber is perforated, likewise in the region of this central zone, with openings of larger dimension, the total cross-sectional area of which is several times larger than the total cross-sectional area of the holes in the shield-plate. In addition, the chamber end wall is perforated, in the region of the two lateral zones, by small dimension holes which provide means for "impact cooling" of the extremities of the shield-plate.

In other words, a characteristic feature of the present invention resides in the arrangement of walls which divide the space separating the shield-plate from the chamber end wall, on the one hand into a double lateral region where "impact cooling" of the extremities of the shield-plate and "film cooling" of the chamber wall take place successively and, on the other hand, into a central region where the shield-plate comprises orifices inclined outwards and dimensioned so as to create a multitude of high speed jets of small dimension.

DESCRIPTION OF THE DRAWINGS

The invention will now be described by way of example with reference to the accompanying drawings in which:

FIGS. 3 and 4 are views similar to FIGS. 1 and 2, respectively, of an improved device in accordance with the present invention.

DESCRIPTION OF THE PREFERRED EMBODIMENT

Figure 2:
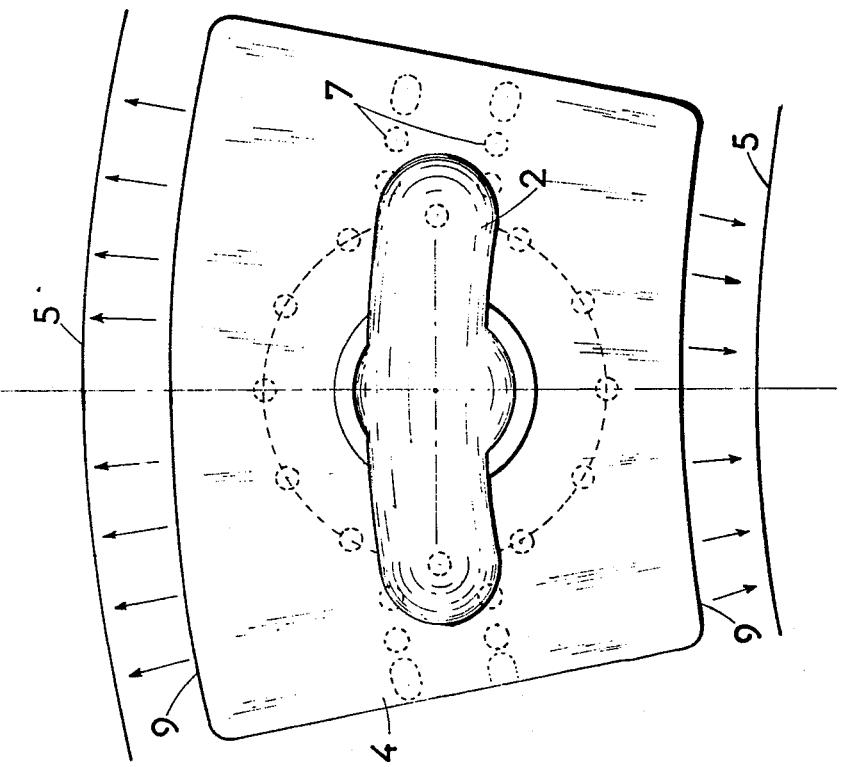
FIGS. 1 and 2 are schematic views in longitudinal and transverse section of a prior art device referred to above.
Figure 1:
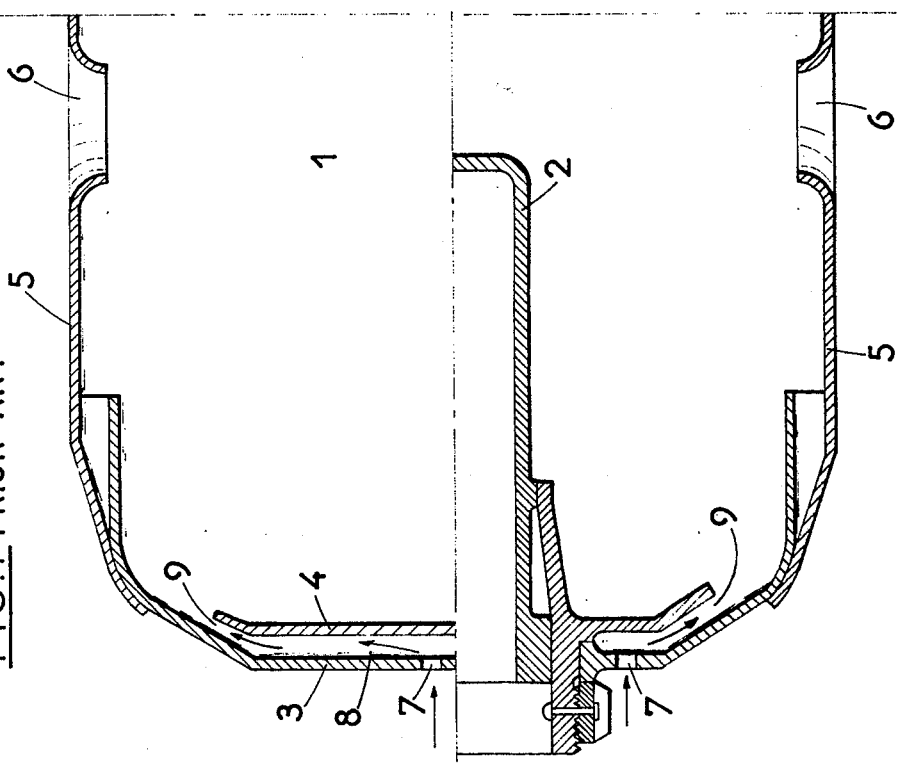

FIGS. 1 and 2 illustrate a combustion chamber 1 containing prevaporization injectors 2 and comprising a dome-shaped end wall 3 protected by shield-plates 4, the combustion chamber 1 being bounded by co-axial annular walls 5 provided with lateral openings 6 for the transverse penetration of dilution air coming from the high pressure flow. As disclosed in the prior specifications previously referred to, the injectors 2 project into the combustion chamber 1 from the dome-shaped end wall through the shield-plates, and as indicated in FIG. 2 these injectors are bent back to discharge in an upstream direction towards and onto the side of the shield-plates remote from the dome-shaped closure; the shield-plates 4 effectively protect the chamber dome 3 by accomplishing the function of heat shields or screens without themselves carrying any mechanical load or being subjected to mechanical stresses. They are, in addition, efficiently cooled by the impact of air jets delivered through calibrated holes 7 in the dome 3 against the backs of the shield-plates 4, the air after impact forming a cooling film which flows at low speed into the space 8 between the shield-plates 4 and the dome 3 to issue from this space through outlet vents 9, thus ensuring protection by "film cooling" of the side wall of in chamber 1.

In FIGS. 3 and 4 the same reference numbers are used to designate the same elements as in the preceding figures and the shield-plate 4 has two walls 10, 11 resting against the dome of chamber 3 and subdividing the space which separates shield-plate 4 from the chamber bottom 3 into three zones, namely a central zone 8a and lateral zones 8b and 8c. Central zones 8a is fed by openings 12 of sufficiently large dimension to minimize the air pressure drop. Holes 13 of small dimension are made through shield-plate 4, their total cross-sectional area being about one third of the cross-sectional area of openings 12. The pressure differential through these orifices, therefore, produces high fluid flow velocities (of the order of 70 to 100 m/s), ensuring atomization of the fuel and generating considerable turbulence in the vicinity of the shield-plate 4. It should be noted that the orifices 13 are provided with a sufficient inclination to prevent any penetration of fuel into the space behind the shield-plate 4.

The two lateral zones 8b and 8c are fed by orifices 16 of small dimension to obtain cooling of the extremities of the shield-plate 4 by impact and subsequently to generate two streams 14 and 15 of relatively low speed, these streams acting as "film cooling".

Trials effected with the same combustion chamber fitted in one instance with known shield-plates as in FIGS. 1 and 2 and in the other instance with improved shield-plates as illustrated in FIGS. 3 and 4 have shown that the fuel combustion efficiency changes from 90% to 97% for the high aerodynamic loading values corresponding to the reduced operating conditions of the engine.

We claim:

1. In a gas-turbine combustion chamber extending longitudinally from an upstream end which comprises:
    longitudinal side walls opposite one another bounding said combustion chamber;
    a transverse dome-shaped closure at said upstream end connecting said side walls and mechanically uniting the same to form an integral box-like structure capable of withstanding mechanical stresses;
    a transverse shield-plate within said chamber extending adjacent to and spaced inwardly of said dome-shaped closure to thermally screen the same, said shield-plate being so mounted with respect to said integral structure as to be substantially unaffected by mechanical stresses withstood thereby; and
    prevaporized fuel injecting means projecting into said combustion chamber from said dome-shaped closure through said shield-plate and having a portion bent back to discharge fuel in an upstream direction towards and onto the downstream-facing side of said shield-plate;
    wherein the improvement comprises
    means positioned between said dome-shaped closure and said shield-plate to partition the space between said dome-shaped closure and the upstream-facing side of said shield-plate into a plenum;
    compressed air passage means opening through said dome-shaped closure into said plenum to feed the same with compressed air and to cool said shield-plate by impact on said upstream-facing side thereof by air jets formed by said passage means; and
    a plurality of outwardly-inclined elemental nozzles extending through said shield-plate from said plenum and having a total cross-sectional area which is substantially smaller than the total cross-sectional area of said compressed air passage means, said elemental nozzles functioning to issue high-velocity air jets from the air located in said plenum through said shield-plate whereby any liquid fuel streaming over said downstream-facing side is atomized by said high-velocity air jets and said air jets increase local turbulence adjacent said downstream-facing side.

2. A combustion chamber as claimed in claim 1, wherein said partitioning means comprise two wall members bearing against said dome-shaped closure and engaging said shield-plate at respective intermediate locations thereof spaced from a periphery thereof, said two wall members bounding therebetween a central zone of said partitioned space forming said plenum and defining two lateral zones on both sides of said central zone.

3. A combustion chamber as claimed in claim 2, further comprising additional compressed air passage means opening through said dome-shaped closure into said two lateral zones to feed the same with compressed air and to cool said shield-plate by impact on peripheral regions of said upstream-facing side thereof by air jets formed by said additional passage means.

4. A combustion chamber as claimed in claim 1, wherein said total cross-sectional areas are in the ratio of about 1:3.

* * * * *